(12) United States Patent
Chen

(10) Patent No.: US 11,012,632 B2
(45) Date of Patent: May 18, 2021

(54) VEHICULAR IMAGE PICKUP DEVICE AND METHOD OF CONFIGURING SAME

(71) Applicant: GETAC TECHNOLOGY CORPORATION, Hsinchu County (TW)

(72) Inventor: Min-Tai Chen, Taipei (TW)

(73) Assignee: GETAC TECHNOLOGY CORPORATION, Hsinchu County (TW)

(*) Notice: Subject to any disclaimer, the term of this patent is extended or adjusted under 35 U.S.C. 154(b) by 73 days.

(21) Appl. No.: 16/151,667

(22) Filed: Oct. 4, 2018

(65) Prior Publication Data

US 2019/0208104 A1 Jul. 4, 2019

Related U.S. Application Data

(60) Provisional application No. 62/613,327, filed on Jan. 3, 2018.

(51) Int. Cl.
| | |
|---|---|
| H04N 5/235 | (2006.01) |
| H04N 5/247 | (2006.01) |
| G06T 7/80 | (2017.01) |
| G06K 9/46 | (2006.01) |
| H04N 5/33 | (2006.01) |
| H04N 5/225 | (2006.01) |
| H04N 9/04 | (2006.01) |

(52) U.S. Cl.
CPC ......... *H04N 5/2354* (2013.01); *G06K 9/4647* (2013.01); *G06T 7/80* (2017.01); *H04N 5/2256* (2013.01); *H04N 5/2258* (2013.01); *H04N 5/2351* (2013.01); *H04N 5/2353* (2013.01); *H04N 5/247* (2013.01); *H04N 5/332* (2013.01); *G06K 2209/15* (2013.01); *G06T 2207/10024* (2013.01); *G06T 2207/10048* (2013.01); *G06T 2207/30252* (2013.01); *H04N 9/045* (2013.01)

(58) Field of Classification Search
CPC .. H04N 5/2258; H04N 5/2354; H04N 5/2256; H04N 5/2351; H04N 5/2353; H04N 5/332; H04N 5/247; H04N 9/045; G06K 2209/15; G06K 9/4647; G06T 2207/30252; G06T 2207/10024; G06T 2207/10048; G06T 7/80
USPC .......... 348/148, 153, 159, 208.14, 143, 139; 382/103, 104
See application file for complete search history.

(56) References Cited

U.S. PATENT DOCUMENTS

| | | | | |
|---|---|---|---|---|
| 9,623,799 | B2 * | 4/2017 | Bingle | B60R 11/04 |
| 2017/0104939 | A1 * | 4/2017 | Sun | H04N 5/33 |
| 2018/0308282 | A1 * | 10/2018 | Yokoi | G06T 7/593 |

* cited by examiner

Primary Examiner — Sherrie Hsia

(57) ABSTRACT

A method of configuring a vehicular image pickup device includes: detecting a first shutter signal of a first image capturing unit and a second shutter signal of a second image capturing unit; outputting a light-up signal according to the first shutter signal and the second shutter signal; and outputting a driving current to an infrared light-emitting element according to the light-up signal.

11 Claims, 6 Drawing Sheets

VEHICULAR IMAGE PICKUP DEVICE AND METHOD OF CONFIGURING SAME

CROSS-REFERENCE TO RELATED APPLICATIONS

This application claims priority from U.S. Patent Application Ser. No. 62/613,327, filed on Jan. 3, 2018, the entire disclosure of which is hereby incorporated by reference.

BACKGROUND OF THE INVENTION

Field of the Invention

The present disclosure relates to image pickup technology and, more particularly, to a vehicular image pickup device and a method of configuring the same.

Description of the Prior Art

The vast majority of the general public always rely upon vehicles as an indispensable means of transportation in daily life; hence, vehicles are on the rise. With road conditions being capricious and unpredictable, vehicles nowadays are usually equipped with vehicular image pickup devices for taking pictures of roads and vehicles ahead.

Each conventional vehicular image pickup device usually has an infrared illumination module for allowing the conventional vehicular image pickup device to take pictures in a low-illuminance environment. However, the infrared illumination module is usually on and thus bright, thereby leading to poor heat dissipation and overexposed pictures. In addition, the infrared illumination module ends up with a short service life.

SUMMARY OF THE INVENTION

In an embodiment of the present disclosure, a method of configuring a vehicular image pickup device includes the steps of: detecting a first shutter signal of a first image capturing unit and a second shutter signal of a second image capturing unit; outputting a light-up signal according to the first shutter signal and the second shutter signal; and outputting a driving current to an infrared light-emitting element according to the light-up signal.

In an embodiment of the present disclosure, a vehicular image pickup device includes a first image capturing unit, a second image capturing unit, a control module and an infrared illumination module. The first image capturing unit captures images of a vehicle to generate a first vehicle image of the vehicle and outputs a first shutter signal. The second image capturing unit captures images of a vehicle to generate a second vehicle image of the vehicle and outputs a second shutter signal. The control module is coupled to the first image capturing unit and the second image capturing unit and includes a logic circuit. The logic circuit detects the first shutter signal and the second shutter signal and outputs a light-up signal according to first shutter signal and the second shutter signal. The infrared illumination module is coupled to the control module and outputs a driving current to an infrared light-emitting element according to the light-up signal.

In conclusion, a vehicular image pickup device and a method of configuring the same according to embodiments of the present disclosure are adapted for use with a vehicle to light up an infrared light-emitting element according to a first shutter signal of a first image capturing unit and a second shutter signal of a second image capturing unit.

DETAILED DESCRIPTION OF THE EMBODIMENTS

Figure 1:
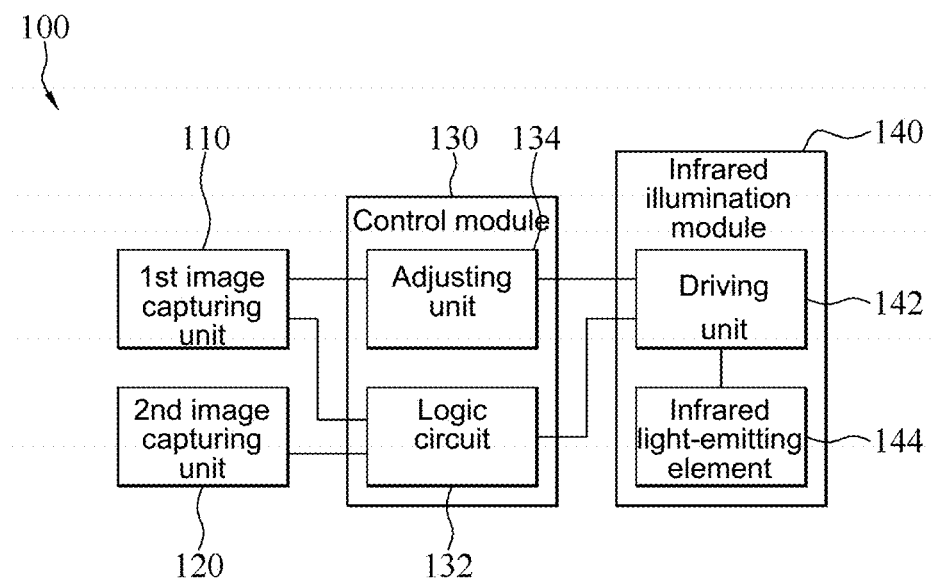
FIG. 1 is a block diagram of circuitry of a vehicular image pickup device according to an embodiment of the present disclosure.
Figure 2:
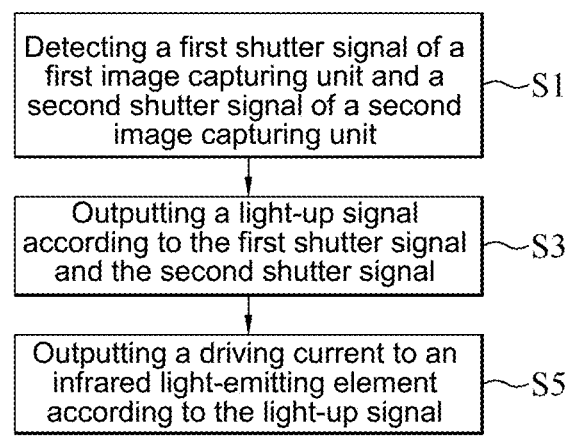
FIG. 2 is a flowchart of a method of configuring a vehicular image pickup device according to an embodiment of the present disclosure.

FIG. 1 is a block diagram of circuitry of a vehicular image pickup device according to an embodiment of the present disclosure. FIG. 2 is a flowchart of a method of configuring a vehicular image pickup device according to an embodiment of the present disclosure. Referring to FIG. 1 and FIG. 2, a vehicular image pickup device 100 is adapted to be placed on a vehicle (hereinafter referred to as "the vehicle). In some embodiments, the vehicular image pickup device 100 is mounted on the vehicle to capture images of a scene ahead of the vehicle, and the scene contains vehicles ahead of the vehicle.

The vehicular image pickup device 100 includes a first image capturing unit 110, a second image capturing unit 120, a control module 130 and an infrared illumination module 140. The first image capturing unit 110, the second image capturing unit 120 and the infrared illumination module 140 are each signal-connected to the control module 130.

The first image capturing unit 110 captures images of vehicles ahead of the vehicle so as to generate a first vehicle image. The first vehicle image includes images of license plates of the vehicles ahead. The first image capturing unit 110 sends a first shutter signal while capturing images. Therefore, the first shutter signal is generated because a shutter of the first image capturing unit 110 is triggered. The second image capturing unit 120 captures images of vehicles ahead of the vehicle so as to generate a second vehicle image. The second vehicle image includes images of the vehicles ahead and the surroundings in front of the vehicles. The second image capturing unit 120 outputs a second shutter signal while capturing images. Therefore, the second shutter signal is generated because a shutter of the second image capturing unit 110 is triggered. The control module 130 is coupled to the first image capturing unit 110 and the second image capturing unit 120. The control module 130 includes a logic circuit 132. The logic circuit 132 detects a first shutter signal and a second shutter signal (step S1) and outputs a light-up signal according to the first shutter signal and the second shutter signal (step S3). The infrared illumination module 140 is coupled to the control module 130. The infrared illumination module 140 includes a driving unit 142 and an infrared light-emitting element 144. The driving unit 142 outputs a driving current to the infrared light-emitting element 144 according to the light-up signal (step S5). In an embodiment aspect, the infrared light-emitting element 144 includes one or more infrared light-emitting diodes.

The vehicular image pickup device 100 is adapted for use with a vehicle to output a driving current according to the first shutter signal of the first image capturing unit 110 and the second shutter signal of the second image capturing unit 120 so as to light up the infrared light-emitting element 144.

In an embodiment, the first image capturing unit 110 is a monochrome image capturing unit. In an embodiment, the first image capturing unit 110 includes a monochrome photosensing component and an infrared filtering component. The monochrome photosensing component captures monochrome images, and its photosensing range is of a wavelength from 400 nm to 1000 nm. The infrared filtering component has a photosensing wavelength of 850±10 nm or 940±10 nm. The infrared light-emitting element 144 has an emission wavelength of 850±10 nm or 940±10 nm. The license plates, for example, reflect infrared light of a wavelength of 850±10 nm or 940±10 nm. The first image capturing unit 110 captures images of vehicles ahead of the vehicle while license plates of the vehicles ahead are exposed to irradiation of infrared light of the aforesaid wavelengths, so as to generate at the very least the first vehicle image which contains images of the license plates of the vehicles ahead. After the infrared light-emitting element 144 has been lit up, infrared light emitted from the infrared light-emitting element 144 reflects off the license plates and thus falls on the first image capturing unit 110. Afterward, the infrared filtering component allows infrared light of 850±10 nm or 940±10 nm to pass and reach the monochrome photosensing component such that the first image capturing unit 110 can capture clear images of the license plates. In an embodiment, the field of view (FOV) of the first image capturing unit 110 depends on the size of the monochrome photosensing component of the first image capturing unit 110 and the focal length of the image pickup lens of the first image capturing unit 110. In an embodiment aspect, the FOV of the first image capturing unit 110 has a field of view (horizontal) (FOV (H)) of 2.51 m and a field of view (vertical) (FOV (V)) of 1.89 m. In an embodiment aspect, the monochrome photosensing component of the first image capturing unit 110 is a photosensing coupled component (charge coupled device, CCD) or a complementary metal-oxide-semiconductor (CMOS) for generating the first vehicle image by conversion. In an embodiment aspect, the first image capturing unit 110 includes an output port for outputting the first vehicle image.

In an embodiment, the second image capturing unit 120 is a color image capturing unit. In an embodiment, the second image capturing unit 120 includes a color photosensing component. The color photosensing component captures color images, and its photosensing range is of a wavelength from 400 nm to 1000 nm. In an embodiment, the FOV of the second image capturing unit 120 depends on the size of the color photosensing component of the second image capturing unit 120 and the focal length of the image pickup lens of the second image capturing unit 120. In an embodiment aspect, the FOV of the second image capturing unit 120 has an FOV (H) of 5.02 m and an FOV (V) of 3.79 m. In an embodiment aspect, the color photosensing component of the second image capturing unit 120 is a photosensing coupled component or a complementary metal-oxide-semiconductor (CMOS) for generating the second vehicle image by conversion. In an embodiment aspect, the second image capturing unit 120 includes an output port for outputting the second vehicle image.

Figure 3:
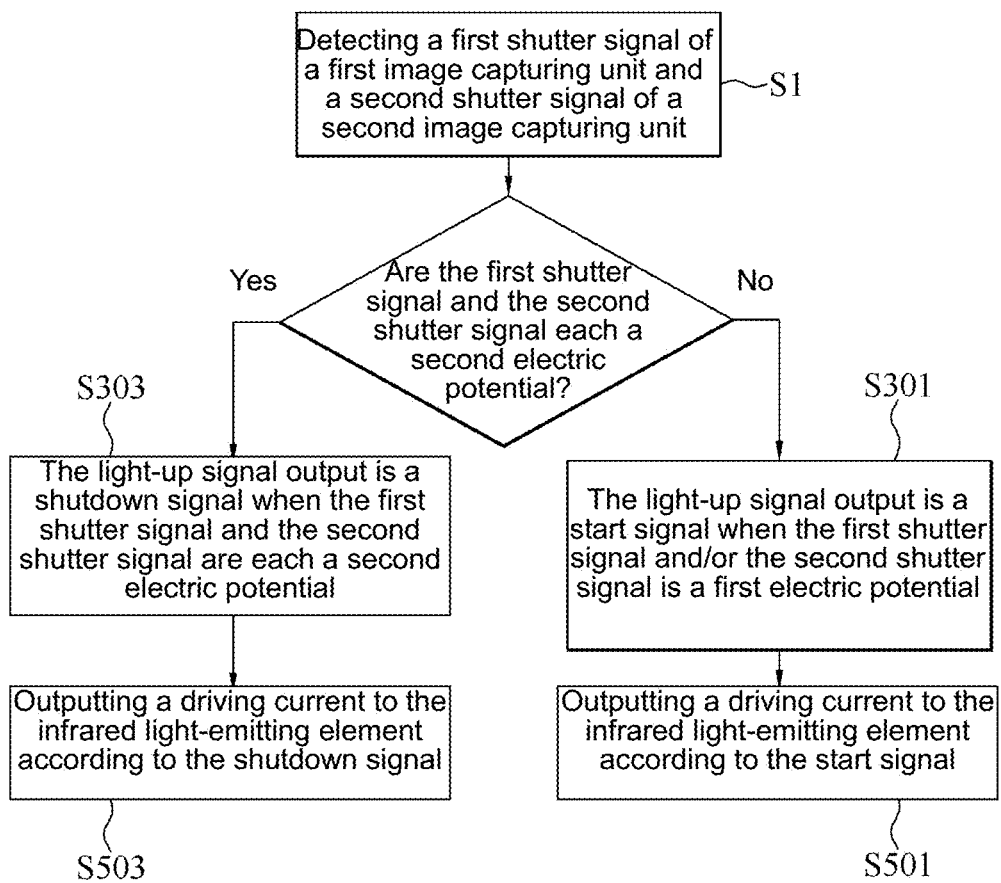
FIG. 3 is a flowchart of the method of configuring the vehicular image pickup device according to another embodiment of the present disclosure.

In an embodiment, the logic circuit 132 of the control module 130 includes an OR gate. Two input ends of the OR gate (the logic circuit 132) are coupled to the first image capturing unit 110 and the second image capturing unit 120, respectively. The output end of the OR gate (logic circuit 132) is coupled to the infrared illumination module 140. As shown in FIG. 3, the method of configuring a vehicular image pickup device involves determining whether the first shutter signal and the second shutter signal are each a second electric potential. If the first shutter signal and/or the second shutter signal is a first electric potential, the light-up signal output from the OR gate (logic circuit 132) is a start signal (step S301). If the first shutter signal and the second shutter signal are each a second electric potential, the light-up signal output from the OR gate (logic circuit 132) is a shutdown signal (step S303). The first electric potential is a high electric potential (or logic 1), whereas the second electric potential is a low electric potential (or logic 0).

For instance, in the first exemplary embodiment, assuming that the logic circuit 132 is implemented as an OR gate, if the first shutter signal is a high electric potential (or logic 1) and the second shutter signal is a high electric potential (or logic 1), the light-up signal output from the logic circuit 132 to the driving unit 142 of the infrared illumination module 140 is a start signal, and the start signal is a high electric potential (or logic 1). The driving unit 142 outputs, in response to the start signal of a high electric potential (or logic 1), a driving current to the infrared light-emitting element 144, so as to light up the infrared light-emitting element 144.

In the second exemplary embodiment, assuming that the logic circuit 132 is an OR gate, if the first shutter signal is a high electric potential (or logic 1) and the second shutter signal is a low electric potential (or logic 0), the light-up signal output from the logic circuit 132 to the driving unit 142 of the infrared illumination module 140 is the start signal, and the start signal is a high electric potential (or logic 1). The driving unit 142 outputs, in response to the start signal of a high electric potential (or logic 1), a driving current to the infrared light-emitting element 144, so as to light up the infrared light-emitting element 144.

In the third exemplary embodiment, assuming that the logic circuit 132 is an OR gate, if the first shutter signal is a low electric potential (or logic 0) and the second shutter signal is a high electric potential (or logic 1), the light-up signal output from the logic circuit 132 to the driving unit 142 of the infrared illumination module 140 is the start signal, and the start signal is a high electric potential (or logic 1). The driving unit 142 outputs, in response to the start signal of a high electric potential (or logic 1), a driving current to the infrared light-emitting element 144, so as to light up the infrared light-emitting element 144.

In the fourth exemplary embodiment, assuming that the logic circuit 132 is an OR gate, if the first shutter signal is a low electric potential (or logic 0) and the second shutter signal is a low electric potential (or logic 0), the light-up signal output from the logic circuit 132 to the driving unit 142 of the infrared illumination module 140 is a shutdown signal, and the shutdown signal is a low electric potential (or logic 0). The driving unit 142 does not output, in response to the shutdown signal of a low electric potential (or logic 0), a driving current to the infrared light-emitting element 144. Alternatively, the driving unit 142 outputs, in response to the shutdown signal of a low electric potential (or logic 0), a driving current of a current level of zero to the infrared light-emitting element 144.

It takes longer to start the shutter while the second image capturing unit 120 (color image capturing unit) is operating in a low-illuminance environment; meanwhile, if it is necessary to light up the infrared light-emitting element 144 again and start the first image capturing unit 110 (monochrome image capturing unit), the second image capturing unit 120 (color image capturing unit) will capture flashing images because of the lighting up of the infrared light-emitting element 144. However, in the aforesaid embodiment, if the first image capturing unit 110 (monochrome image capturing unit) and/or the second image capturing unit 120 (color image capturing unit) starts to capture images, that is, the first shutter signal and/or the second shutter signal is the first electric potential, starting the infrared light-emitting element 144 will not cause the second image capturing unit 120 (color image capturing unit) to capture flashing images. If none of the first image capturing unit 110 (monochrome image capturing unit) and the second image capturing unit 120 (color image capturing unit) has started, the infrared light-emitting element 144 is shut down, so as to not only extend the service life of the infrared illumination module 140, but also enhance heat dissipation.

Figure 4:
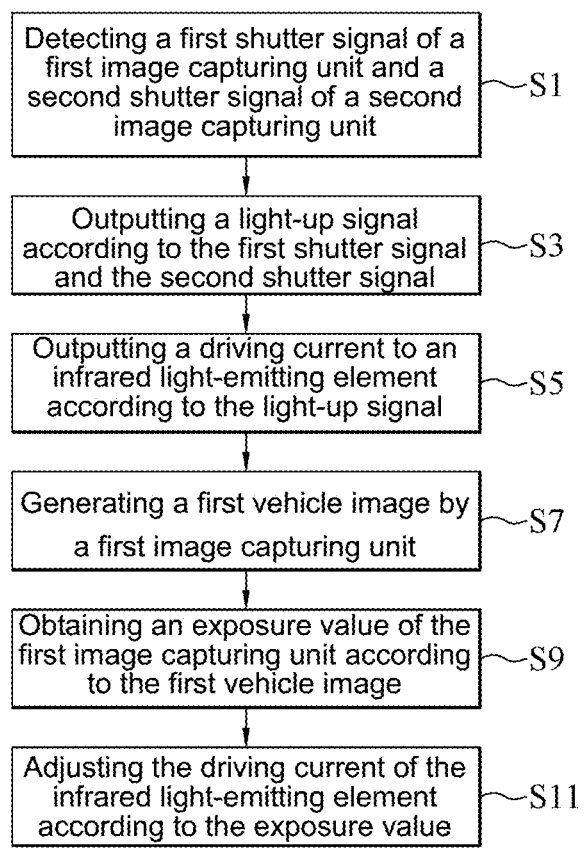
FIG. 4 is a flowchart of the method of configuring the vehicular image pickup device according to yet another embodiment of the present disclosure.

In an embodiment illustrated by FIG. 1 and FIG. 4, the control module 130 further includes an adjusting unit 134. The adjusting unit 134 is coupled to the first image capturing unit 110 and the driving unit 142 of the infrared illumination module 140. After the first image capturing unit 110 has captured images of the scene and thus obtained the first vehicle image (step S7), the adjusting unit 134 receives and analyzes the first vehicle image, so as to obtain its exposure value (EV) (step S9). Afterward, the adjusting unit 134 adjusts the driving current of the infrared light-emitting element 144 according to the exposure value (step S11). When the vehicular image pickup device 100 determines, according to the first shutter signal of the first image capturing unit 110 and the second shutter signal of the second image capturing unit 120, to output the driving current and thus light up the infrared light-emitting element 144, the adjusting unit 134 adjusts the driving current of the infrared light-emitting element 144 in accordance with the magnitude of the exposure value of the first vehicle image, so as to alter the brightness of the infrared light-emitting element 144 by adjusting the light emission power value of the infrared light-emitting element 144. In an embodiment aspect, the adjusting unit 134 includes an image signal processor (ISP), but the present disclosure is not limited thereto.

In an embodiment aspect, the control module 130 is a microprocessor, microcontroller, digital signal processor, central processing unit (CPU), or any analog and/or digital device based on the operating command and the operating signal, but the present disclosure is not limited thereto.

In an exemplary embodiment of step S9, the adjusting unit 134 performs graphic recognition on the first vehicle image to calculate the brightness of all the pixels in the first vehicle image so as to obtain the exposure value thereof. In another exemplary embodiment of step S9, the adjusting unit 134 performs graphic recognition on the first vehicle image to calculate the brightness of the pixels in the images of the license plates attributed to the vehicles ahead and contained in the first vehicle image so as to obtain the exposure value thereof.

Figure 5:
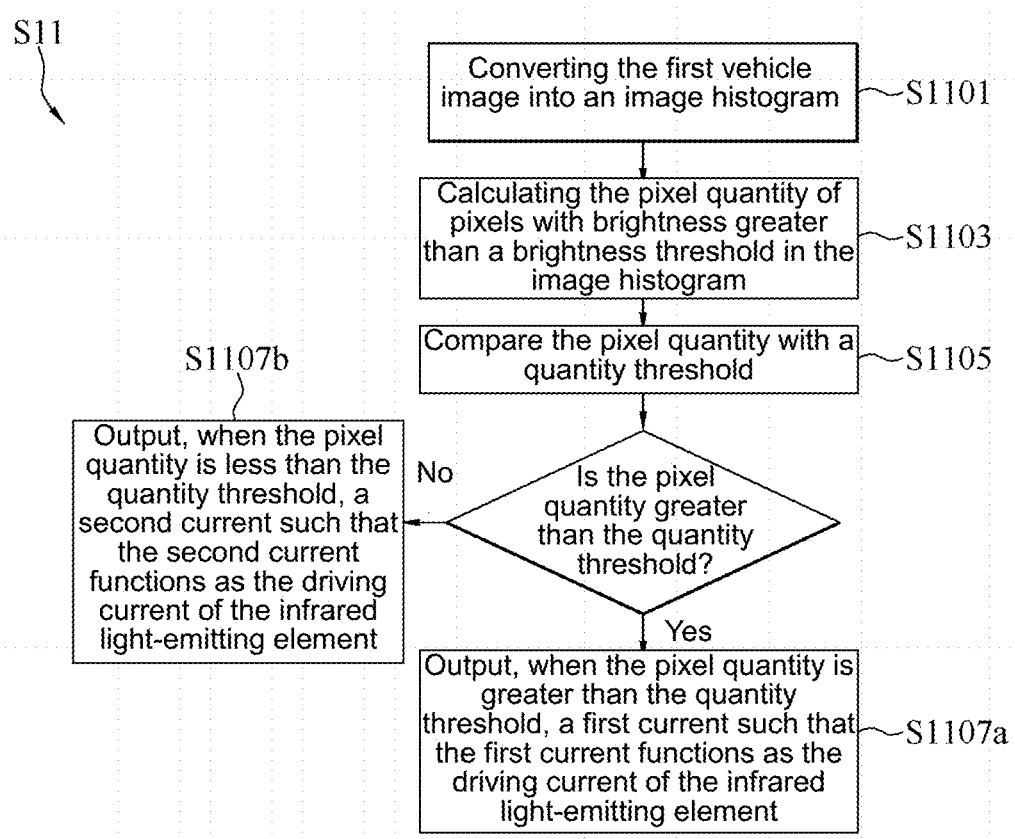
FIG. 5 is a flowchart of an embodiment of step S11.
Figure 6:
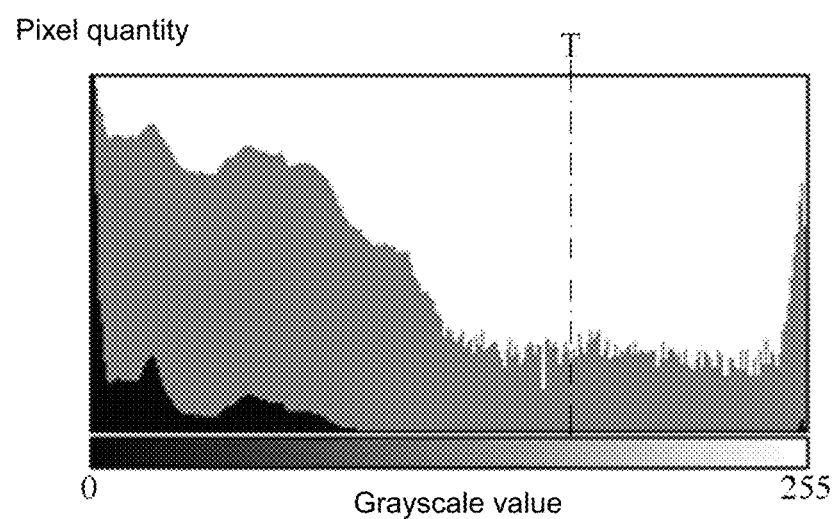
FIG. 6 is an image histogram of an embodiment of a first vehicle image.

In an embodiment illustrated by FIG. 1, FIG. 5 and FIG. 6, after the first image capturing unit 110 has captured images of the scene and obtained the first vehicle image (step S7), the adjusting unit 134 receives and analyzes the first vehicle image to therefore convert the first vehicle image into an image histogram (step S1101). This step entails counting the number of pixels of the same brightness in the first vehicle image to therefore convert the first vehicle image into an image histogram. The horizontal axis of the image histogram represents grayscale values, for example, 0 to 255, of all the pixels in the first vehicle image. The vertical axis of the image histogram represents pixel quantity corresponding to the grayscale values of the horizontal axis.

The adjusting unit 134 calculates the pixel quantity of pixels with brightness greater than a brightness threshold T in the image histogram (step S1103). The brightness threshold T is set to a predetermined grayscale value. Assuming that the brightness threshold T is a single numeric value, such as 160, the brightness threshold T divides the horizontal axis of the image histogram into two segments. The adjusting unit 134 calculates the pixel quantity of the pixels with brightness greater than the brightness threshold T in the image histogram. The adjusting unit 134 compares the pixel quantity of the pixels having brightness greater than the brightness threshold T with a quantity threshold (step S1105). The adjusting unit 134 determines whether the pixel quantity of the pixels having brightness greater than the brightness threshold T is greater than the quantity threshold.

In this embodiment, the quantity threshold is a single quantity threshold. When the pixel quantity of the pixels having brightness greater than the brightness threshold T is greater than the quantity threshold, it is determined that the first vehicle image has a high exposure value. The adjusting unit 134 adjusts the driving current of the infrared light-emitting element 144 such that the driving current functions as the first current, and thus the infrared illumination module 140 outputs the first current to function as the driving current of the infrared light-emitting element 144 (step S1107a). When the pixel quantity of the pixels having brightness greater than the brightness threshold T is less than the quantity threshold, it is determined that the first vehicle image has a low exposure value. The adjusting unit 134 adjusts the driving current of the infrared light-emitting element 144 such that the driving current functions as the second current, and thus the infrared illumination module 140 outputs the second current to function as the driving current of the infrared light-emitting element 144 (step S1107b). The first current is weaker than the second current.

The quantity threshold is illustrative and thus subject to changes as needed. In some other embodiments, the actual quantity threshold is provided in the form of a combination of two quantity thresholds (i.e., upper quantity threshold and lower quantity threshold). In step S1105, the quantity and the driving current of the results of comparison between the pixel quantity of the pixels having brightness greater than the brightness threshold and the quantity thresholds vary with the quantity thresholds. For instance, when the pixel quantity of the pixels having brightness greater than the brightness threshold is greater than the upper quantity threshold, it will be determined that the first vehicle image has a high exposure value. The adjusting unit 134 adjusts the driving current of the infrared light-emitting element 144 such that the driving current functions as the first current. When the pixel quantity of the pixels having brightness greater than the brightness threshold is between the upper quantity threshold and the lower quantity threshold, the adjusting unit 134 adjusts the driving current of the infrared light-emitting element 144 such that the driving current functions as the second current. When the pixel quantity of the pixels having brightness greater than the brightness threshold is less than the lower quantity threshold, it will be determined that the first vehicle image has a low exposure value. The adjusting unit 134 adjusts the driving current of the infrared light-emitting element 144 such that the driving current functions as a third current. The first current is weaker than the second current, and the second current is weaker than the third current.

In an embodiment, the first image capturing unit 110, the second image capturing unit 120, the control module 130 and the infrared illumination module 140 are integrated into the same image pickup system, such as an image pickup device which comes with an infrared lamp, two different image capturing units and a processor.

In conclusion, a vehicular image pickup device and a method of configuring the same according to embodiments of the present disclosure are adapted for use with a vehicle to light up an infrared light-emitting element according to a first shutter signal of a first image capturing unit and a second shutter signal of a second image capturing unit.

Although the present disclosure is disclosed above by preferred embodiments, the preferred embodiments are not restrictive of the present disclosure. Slight changes and modifications made by persons skilled in the art to the preferred embodiments without departing from the spirit of the present disclosure must be deemed falling within the scope of the present disclosure. Accordingly, the legal protection for the present disclosure should be defined by the appended claims.

What is claimed is:

1. A method of configuring a vehicular image pickup device, the vehicular image pickup device comprising a first image capturing unit and a second image capturing unit, wherein the first image capturing unit and the second first image capturing unit are different physical elements, the method comprising the steps of:
   detecting a first shutter signal of the first image capturing unit and a second shutter signal of the second image capturing unit;
   outputting a light-up signal according to the first shutter signal and the second shutter signal; and
   outputting a driving current to an infrared light-emitting element according to the light-up signal,
   wherein the step of outputting the light-up signal according to the first shutter signal and the second shutter signal comprises the sub-steps of:
      the light-up signal output is a start signal when at least one of the first shutter signal and the second shutter signal is a first electric potential corresponding to the respective first image capturing unit or second image capturing unit capturing images; and
      the light-up signal output is a shutdown signal when the first shutter signal and the second shutter signal are each a second electric potential corresponding to the respective first image capturing unit and second image capturing unit not capturing images.

2. The method of claim 1, further comprising the steps of:
   generating a first vehicle image by the first image capturing unit;
   obtaining an exposure value of the first image capturing unit according to the first vehicle image; and
   adjusting the driving current of the infrared light-emitting element according to the exposure value.

3. The method of claim 2, wherein the step of obtaining the exposure value of the first image capturing unit comprises the sub-step of:
   performing graphic recognition on the first vehicle image captured by the first image capturing unit so as to obtain the exposure value of the first vehicle image.

4. The method of claim 2, further comprising the steps of:
   generating a first vehicle image by the first image capturing unit;
   obtaining an exposure value of the first image capturing unit according to the first vehicle image; and
   adjusting the driving current of the infrared light-emitting element according to the exposure value;
   wherein the step of adjusting the driving current of the infrared light-emitting element according to the exposure value comprises the sub-steps of:
      converting the first vehicle image into an image histogram;
      calculating a pixel quantity of pixels with brightness greater than a brightness threshold in the image histogram;
      comparing the pixel quantity with a quantity threshold;
      outputting a first current to function as the driving current of the infrared light-emitting element when the pixel quantity is greater than the quantity threshold; and
      outputting a second current to function as the driving current of the infrared light-emitting element when the pixel quantity is less than the quantity threshold, wherein the first current is weaker than the second current.

5. A method of configuring a vehicular image pickup device, comprising the steps of:
   detecting a first shutter signal of a first image capturing unit and a second shutter signal of a second image capturing unit;
   outputting a light-up signal according to the first shutter signal and the second shutter signal; and
   outputting a driving current to an infrared light-emitting element according to the light-up signal;
   generating a first vehicle image by the first image capturing unit;
   obtaining an exposure value of the first image capturing unit according to the first vehicle image; and
   adjusting the driving current of the infrared light-emitting element according to the exposure value;
   wherein the step of adjusting the driving current of the infrared light-emitting element according to the exposure value comprises the sub-steps of:
      converting the first vehicle image into an image histogram;
      calculating a pixel quantity of pixels with brightness greater than a brightness threshold in the image histogram;
      comparing the pixel quantity with a quantity threshold;
      outputting a first current to function as the driving current of the infrared light-emitting element when the pixel quantity is greater than the quantity threshold; and
      outputting a second current to function as the driving current of the infrared light-emitting element when the pixel quantity is less than the quantity threshold, wherein the first current is weaker than the second current.

6. A vehicular image pickup device, comprising:
   a first image capturing unit for capturing images of a vehicle to generate a first vehicle image of the vehicle and outputting a first shutter signal;
   a second image capturing unit for capturing images of the vehicle to generate a second vehicle image of the vehicle and outputting a second shutter signal, wherein the first image capturing unit and the second image capturing unit are different physical elements;

a control module coupled to the first image capturing unit and the second image capturing unit, the control module comprising a logic circuit, the logic circuit configured to detect the first shutter signal and the second shutter signal and output a light-up signal according to the first shutter signal and the second shutter signal; and an infrared illumination module coupled to the control module and adapted to output a driving current to an infrared light-emitting element according to the light-up signal, wherein the light-up signal output from the logic circuit is a start signal when one of the first shutter signal and the second shutter signal is a first electric potential corresponding to the respective first image capturing unit or second image capturing unit capturing images, and the light-up signal output from the logic circuit is a shut-down signal when the first shutter signal and the second shutter signal are each a second electric potential corresponding to the respective first image capturing unit and second image capturing unit not capturing images.

7. The vehicular image pickup device of claim 6, wherein the control module further comprises:

an adjusting unit coupled to the first image capturing unit and the infrared illumination module to obtain an exposure value of the first image capturing unit according to the first vehicle image and adjust the driving current of the infrared light-emitting element according to the exposure value.

8. The vehicular image pickup device of claim 6, wherein the first image capturing unit is a monochrome image capturing unit, and the second image capturing unit is a color image capturing unit.

9. The vehicular image pickup device of claim 6, wherein the first image capturing unit further comprises an infrared filtering component.

10. The vehicular image pickup device of claim 6, wherein the logic circuit comprises an OR gate.

11. The vehicular image pickup device of claim 6, wherein the logic circuit is further configured to:

obtain an exposure value of the first image capturing unit according to the first vehicle image; and adjust the driving current of the infrared light-emitting element according to the exposure value by:

converting the first vehicle image into an image histogram;

calculating a pixel quantity of pixels with brightness greater than a brightness threshold in the image histogram;

comparing the pixel quantity with a quantity threshold;

outputting a first current to function as the driving current of the infrared light-emitting element when the pixel quantity is greater than the quantity threshold; and outputting a second current to function as the driving current of the infrared light-emitting element when the pixel quantity is less than the quantity threshold, wherein the first current is weaker than the second current.

* * * * *